Patented Nov. 13, 1928.

1,691,768

UNITED STATES PATENT OFFICE.

LESTER KIRSCHBRAUN, OF LEONIA, NEW JERSEY.

PROCESS OF PRODUCING EMULSIONS OR DISPERSIONS AND PRODUCT THEREOF.

No Drawing. Application filed March 16, 1928. Serial No. 262,320.

This invention relates to improvements in process of making emulsions and products produced thereby and is directed particularly to so adjusting the character of the emulsifying agent as to produce the most perfect emulsion. The invention has more particular reference to emulsions or dispersions of pitch and/or oleaginous bodies with mineral powders insoluble in water but suspendable therein to form a paste or slurry. Such powders comprise clays, bentonites, argillaceous minerals, finely divided silicates, metallic oxides, and hydroxides, pigments, and in general, finely divided mineral powders having more or less plasticity and/or viscosity when suspended or mixed with water to form a paste or slurry.

The pitch or oleaginous material dealt with in this connection includes a wide variety of substances; namely bitumens, liquid and solid hydrocarbons, resins, natural and artificial, ester gums, stearines, waxes, tempered if desired with fluxing oils, which may be petroleum products, drying or non-drying oils or fatty acids. The more solid of these may be generally said to partake of a pitchy nature and possess in common the property of being immiscible with water and rendered fluid or more limpid with heat. These substances constitute in this process the material undergoing dispersion and comprise the dispersed phase of the product.

In forming emulsions of bitumens with clay or similar emulsifying agent, I have found that the ability of the clay to emulsify a given bitumen is not solely dependent upon the colloidal properties of the clay and I have further discovered that certain clays have the ability to emulsify various bitumens with different results, my experience in this connection indicating very distinctly that certain types of pitches and oleaginous bodies emulsify more readily with particular types of mineral substances of the above character. That is to say, a certain clay which is capable of emulsifying, say, 4 parts of an asphalt having for example a melting point of 150 degrees F. may emulsify a much larger quantity of similar asphalt of a lower melting point, or may be capable of producing a much better emulsion with such material as a stearine pitch. In other words, there seems to be no fixed capacity of a given clay to emulsify various bituminous materials and likewise, a given bituminous material may be emulsified to much better advantage by employing different clays. While usually some quantity of most pitches can be dispersed with many kinds of mineral substances as the emulsifying agent, yet the amount of pitch dispersed in many instances is so small as to constitute a minor or insufficient portion of the resulting product. The resulting dispersion in such cases is so highly loaded with mineral matter that the pitchy substance is unable to function as a binder and no utility of commercial importance resides in a product of such character.

I have found, however, that by varying the kinds of clays or other emulsifying agent and more particularly, by combining various clays, an emulsifying agent is very frequently produced which is capable of dispersing a given bitumen to much better advantage than is possible by the use of either clay alone.

As an example of this, I may take a certain bentonite and in using the same as an emulsifying agent for steam reduced Mexican asphalt of about 110 degrees melting point, I am able to produce a relatively poor emulsion carrying possibly only one or two parts of asphalt by weight to one of the bentonite, the product being a relatively coarse dispersion. I may take the same asphalt and with a New Jersey pottery clay, I may produce an emulsion of fairly good dispersion carrying 5 parts by weight of asphalt to one part of clay. If however, I combine the two emulsifying agents named, taking say for example, 5 parts of bentonite to about 2 parts of the New Jersey clay, and employing this combination as an emulsifying agent, I am able to readily emulsify 20 or 30 parts of the asphalt referred to, and produce a relatively fine dispersion. In this connection it should be mentioned that the nature of the water has an important influence in determining the optimum relationships between combinations of clays.

As another example of thus advantageously combining different emulsifying agents, 50 parts of starch and about one part by weight of tannic acid have been employed in the form of an aqueous paste for dispersing asphalt of 100 to 200° F. melting point, with a resultant dispersion which has a much higher ratio of dispersed material therein, than is attainable when producing a dispersion of substantially the same particle size with either the starch alone, or with the tannic acid. Thus while the starch alone may disperse sufficient quantities of this base to produce a product in which the ratio of base to the starch is about 12 to 1, by using the tannic acid in combination with the starch, I am able to produce with greater ease a dispersed product of substantially the same, and even finer, particle size than straight starch dispersion, but in which the quantity of base dispersed is in excess of 30 times the weight of the combined material used as the dispersing agent. This ratio likewise is much higher than is possible with tannic acid alone.

It is apparent that there is some relationship between the various emulsifying agents, as for example, clays, and between the bitumen and the clay, or combination of clays, which widely influence the nature of the emulsifying operation. This difference in behavior results not only in variations in degree of dispersion and amount of bitumen capable of being emulsified, but also in the shape of the particles and color of the finished emulsion.

For example in using the above named combination of clays, the resulting emulsion is brown, whereas, by substituting a different clay such as an Ohio fire clay for the New Jersey pottery clay, or by omitting the New Jersey clay entirely, the emulsion is black and in the latter case the particles are round. The emulsifying operation carried out in the presence of the New Jersey clay produces particles more or less ovoid and flat and scaly, which are shown to be quite transparent upon microscopic examination.

The mutual and/or co-acting relationship above referred to, as existing between these various materials, which enables the aforesaid results to be achieved, is reflected in the hydrogen ion concentration of the aqueous suspension or paste of the emulsifying agent. Thus, when emulsifying steam refined Mexican asphalt of about 110° F. melting point, with clay an optimum condition for emulsification exists at a pH value around 6.5, and the emulsifying media will be used in such proportions as will effect the desired pH value. The proportions to be used will depend, of course, upon the pH characteristics of the individual media and their mutual interaction and ability to modify the pH value thereof.

When using a mixture of starch and tannic acid, as above described, the pH value of the mixture may be similarly adjusted by varying the proportions of the constituents. Thus, for example, with these particular emulsifying agents in proportions as above set forth, the pH value of the resultant mixture will be about 4.0 to 4.5.

The pH value at which any given base will be most readily dispersed will depend upon the character of the emulsifying agent, and likewise any given dispersing agent will disperse various pitches or other bases at different optimum pH values, and by suitable test the optimum value at which a given emulsifying media will disperse a given base or the optimum proportions of another emulsifying agent required to produce the optimum condition of emulsification of the given base with the said media, may be readily determined, and thereafter proportions required to give a like pH value are used to emulsify the said base with such media.

It will thus be apparent that by combining clays or other emulsifying agents having different characteristics, the pH value or pH range of the aqueous dispersion means, or components of the system, may be adjusted to suit the particular base being emulsified therewith and wide variations in the emulsification and in the character of the emulsion may be obtained and the peculiarities of behavior of the various emulsifying agents and pitches may be controlled, so that practically any emulsifying mineral in finely divided form can be treated so as to emulsify practically any pitch.

The dispersing media adjusted to the desired point, as above described, by suitable combinations of different emulsifying agents, is utilized in effecting the dispersion of the selected base in the manner set forth in my issued Patents, Numbers 1,302,810 and 1,615,303.

The terms "bitumen", "pitch", "bitumen pitch type", "pitchy", "bituminous type" are to be defined as including any one or a mixture of the materials listed heretofore, having the property of being immiscible with water and rendered fluid with heat.

This application is a continuation in part of my earlier application Serial Number 583,405 filed Aug. 21, 1922.

I claim as my invention:

1. A process of forming a bituminous type emulsion comprising combining a plurality of coacting emulsifying agents in predetermined proportions in accordance with the characteristics of the bitumen to be dispersed, said co-acting agents individually having different emulsive characteristics, and dispersing bitumen in an aqueous medium containing said co-acting agents.

2. A process of forming a bituminous type emulsion comprising controlling the dispersion by combining a plurality of mineral emulsifying agents in predetermined varying proportions in accordance with the characteristics of the bitumen to be dispersed and effecting dispersion of bitumen in an aqueous vehicle in the presence of said emulsifying agents.

3. In a method of forming a bituminous type emulsion, the steps comprising combining a plurality of coacting mineral substances in predetermined proportions whereby to adjust the pH value thereof, and dispersing bitumen in an aqueous medium containing said mineral substances in suspension.

4. A process of forming a bituminous type emulsion comprising controlling the dispersion by combining a clay-like emulsifying agent with a coacting modifying agent in predetermined proportions in accordance with the bitumen to be dispersed whereby to enhance the dispersive characteristics of the clay-like emulsifying agent, and effecting dispersion of bitumen in an aqueous vehicle in the presence of said agents.

5. An aqueous bituminous type emulsion comprising bentonite and a clay of lesser colloidality than the bentonite, said bentonite and clay constituting the dispersing agent.

6. An aqueous bituminous emulsion comprising bentonite and a modifying agent of lesser colloidality than the bentonite in predetermined proportions in accordance with the bitumen to be dispersed, said bentonite and modifying agent constituting the dispersing agent.

7. In the process of producing a dispersion of a pitchy substance in an aqueous vehicle, the step of adjusting the hydrogen ion concentration of the aqueous dispersion means to a predetermined pH value.

8. In the process of producing a dispersion of substances normally immiscible with water in an aqueous vehicle, the step of adjusting the hydrogen ion concentration of the aqueous dispersion means to a predetermined pH value.

9. In the dispersion of a pitchy substance with a paste forming mineral in an aqueous suspension, the step of adjusting the hydrogen ion concentration of the aqueous suspension to a predetermined pH value.

10. A process of making a dispersion which comprising adjusting the hydrogen ion concentration of an aqueous medium containing insoluble mineral dispersive media to a predetermined pH value and dispersing pitch in said aqueous medium.

11. A process of making a dispersion which comprises adjusting the hydrogen ion concentration of an aqueous dispersion medium containing clay-like material to a predetermined pH value, and dispersing pitch in said aqueous medium.

12. In a process of producing a dispersion of a pitchy substance in an aqueous vehicle containing dispersive media, the step which includes the addition of a mineral substance to adjust the hydrogen ion concentration of the aqueous dispersive media to a predetermined pH value.

13. In a process of dispersing a pitch-like substance in an aqueous medium having a predetermined pH value, the step of enhancing the ability of the pitch to undergo dispersion by modifying one of said phases to adjust the pH relation between the phases.

14. In the process of producing a dispersion of a pitchy substance in an aqueous vehicle, the step of adjusting the hydrogen ion concentration of the aqueous dispersion means to a predetermined pH value, by combining a second dispersing agent therewith.

15. In the process of producing a dispersion of a pitchy substance in an aqueous vehicle, the step of adjusting the hydrogen ion concentration of the aqueous dispersion means to a predetermined pH value, by combining a second dispersing agent therewith, in quantities sufficient to produce a modified dispersion means of desired pH value.

16. In the dispersion of a pitchy substance with a paste forming mineral in an aqueous suspension, the step of adjusting the hydrogen ion concentration of the aqueous suspension to a predetermined pH value, by combining a dispersing agent therewith.

17. A process of making a dispersion which comprises adjusting the hydrogen ion concentration of an aqueous dispersion medium containing insoluble mineral dispersive media to a predetermined pH value, by combining a second dispersing agent with an aqueous suspension of said media, and dispersing pitch in said aqueous medium.

18. Steps in the process of producing aqueous dispersions of normally non-fluid bitumens which comprise admixing a dispersing agent with sufficient quantities of an argillaceous substance to produce a mixture of a predetermined pH value and effecting dispersion of the selected bitumen with said mixture.

19. Steps in the process of producing aqueous dispersions of substances normally immiscible with water which comprise forming an aqueous suspension containing a plurality of argillaceous dispersive media, the constituents being present in such regulated quantities as to impart a predetermined pH value to the suspension, and effecting dispersion of a bitumen with said suspension.

20. In the production of aqueous dispersions of bitumen pitch type material, the steps which comprise adding clay to a paste forming mineral powder in regulated quantities to produce a mixture of predetermined pH value, and dispersing bitumen in an aqueous medium containing said mixture.

21. The process of producing dispersion of a bitumen pitch in an aqueous medium containing mineral powder dispersive media, which comprises making an aqueous suspension of a mineral powder dispersing agent, altering the pH value of the suspension to a point suitable for efficient dispersion of the said bitumen pitch, and dispersing said bitumen pitch with the altered suspension.

22. A process of forming a bituminous type emulsion comprising combining a plurality of co-acting argillaceous emulsifying agents in variable proportions in accordance with the character of the bitumen to be dispersed, said co-acting argillaceous emulsifying agents individually having different emulsive characteristics, in dispersing bitumen in an aqueous media containing said co-acting argillaceous agents.

In testimony whereof I affix my signature.

LESTER KIRSCHBRAUN.